INVENTOR.
RONALD J. RICCIARDI

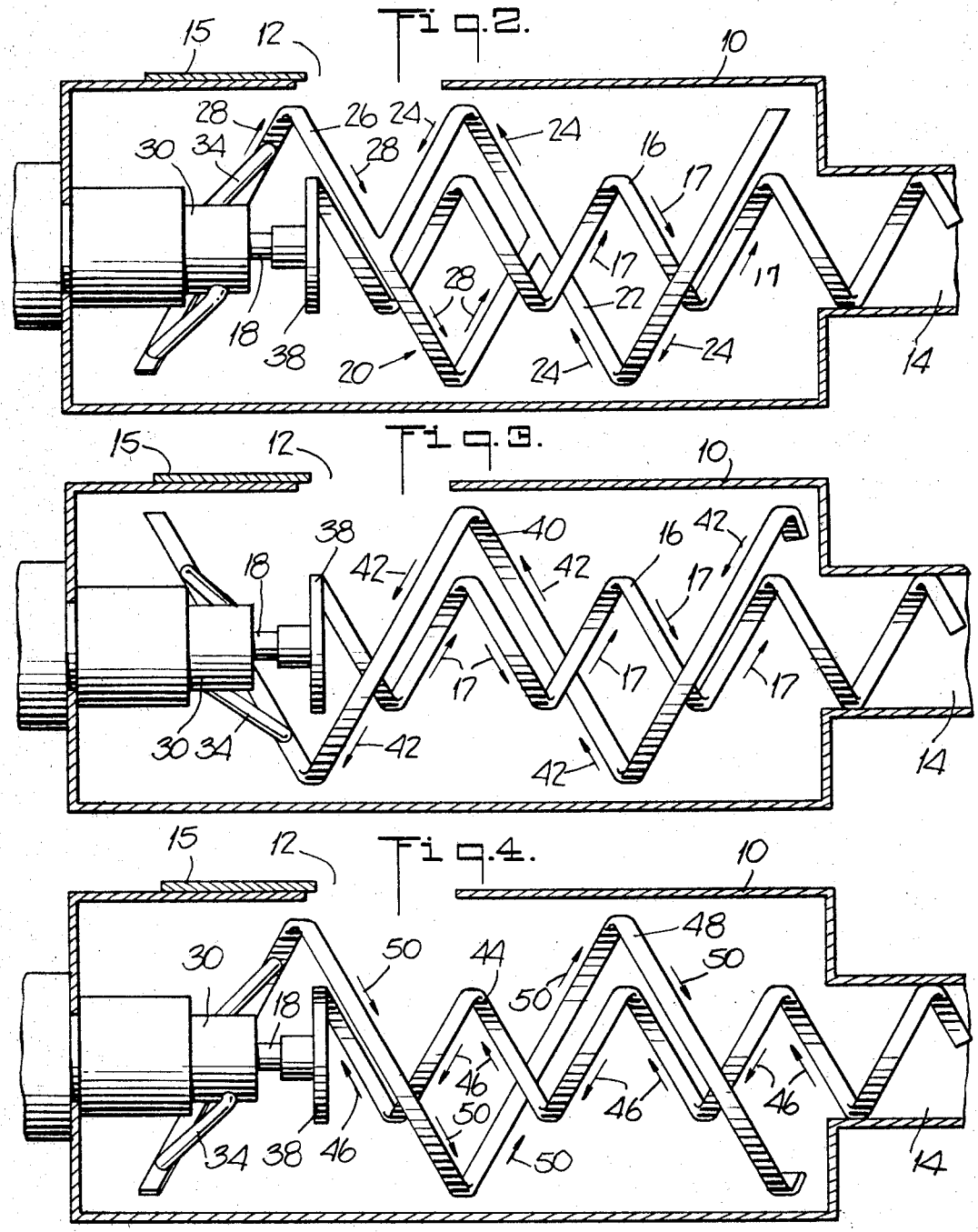

United States Patent Office 3,439,836
Patented Apr. 22, 1969

3,439,836
APPARATUS FOR CONDITIONING AND DISPENSING PARTICULATED MATERIAL
Ronald J. Ricciardi, 193 MacArthur Ave., Garfield, N.J. 07026
Filed Jan. 27, 1967, Ser. No. 612,156
Int. Cl. B65d 83/06
U.S. Cl. 222—240                                      6 Claims

ABSTRACT OF THE DISCLOSURE

Apparatus for conditioning and dispensing particulated solid material having a chamber in which two concentric rotating augers are disposed in overlapping relationship. A portion of the second auger has a reversed pitch with respect to the first auger for creating a counter-current movement of the material in the chamber.

---

This invention relates to feeding apparatus and more particularly to apparatus for conditioning and dispensing particulate solid material. The apparatus embodying the present concept is particularly adapted, among other possible uses, for conditioning and dispensing material wherein accurate volumetric metering is desired. Such material includes inter alia, flour, salt, grain, coffee, powdered cream, cocoa, and even material containing a percentage of moisture.

The present invention concerns improvements in the feeding apparatus for particulate material described in U.S. Patent No. 3,186,602 and provides a number of advantages over the apparatus disclosed in said patent.

Briefly, the present invention contemplates the provision of apparatus for conditioning and dispensing particulated solid material including a closed conditioning chamber having an upper receiving inlet and a dispensing outlet. A first auger is disposed within the chamber and extends toward the outlet. This auger has a helical blade for propelling the material toward the outlet in response to rotation thereof. A second larger open spiral auger is mounted co-axially with respect to said first auger for conditioning and feeding the material into the first auger in response to rotation of the second auger. This auger is disposed concentrically and in overlapping relationship with respect to the first auger. A portion of the second auger has a reversed pitch with respect to the pitch of the first auger for creating a counter-current movement of the material in the conditioning chamber to the direction imparted to it by the first auger. Also, means are provided for rotating the augers at a preselected ratio of speed.

A feature of this invention resides in the provision of a new and improved apparatus for conditioning and dispensing particulated solid material which eliminates any possibility of material compacting at either end of the conditioning chamber, while still insuring a constant and reliable flow of material into the first or metering auger. Such compaction can be extremely detrimental to both feeding accuracy, as well as the machine itself. If permitted to compact, the material will tend to adhere more readily to itself and the surrounding surfaces, and the material can become degraded, and even cause overloading of the driving mechanism.

Another feature of this invention is the provision of apparatus for conditioning and dispensing particulated solid material which can successfully handle material which could not be handled by prior art machines.

According to the present invention, as another feature thereof, there is provided a new and improved apparatus for conditioning and dispensing particulate solid material which is reliable, economical, efficient, accurate, and which is otherwise well suited for its intended purposes.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Several embodiments of the invention have been chosen for purposes of illustration and description, and are shown in the accompanying drawings, forming a part of the specification, wherein:

FIG. 2 is a vertical sectional view of the conditioning chamber and the augers according to one form of my invention;

FIG. 3 is a vertical sectional view similar to FIG. 2, but showing a different form of the invention; and FIG. 4 is another vertical sectional view similar to FIGS. 2 and 3, but showing still another form of my invention.

Figure 1:
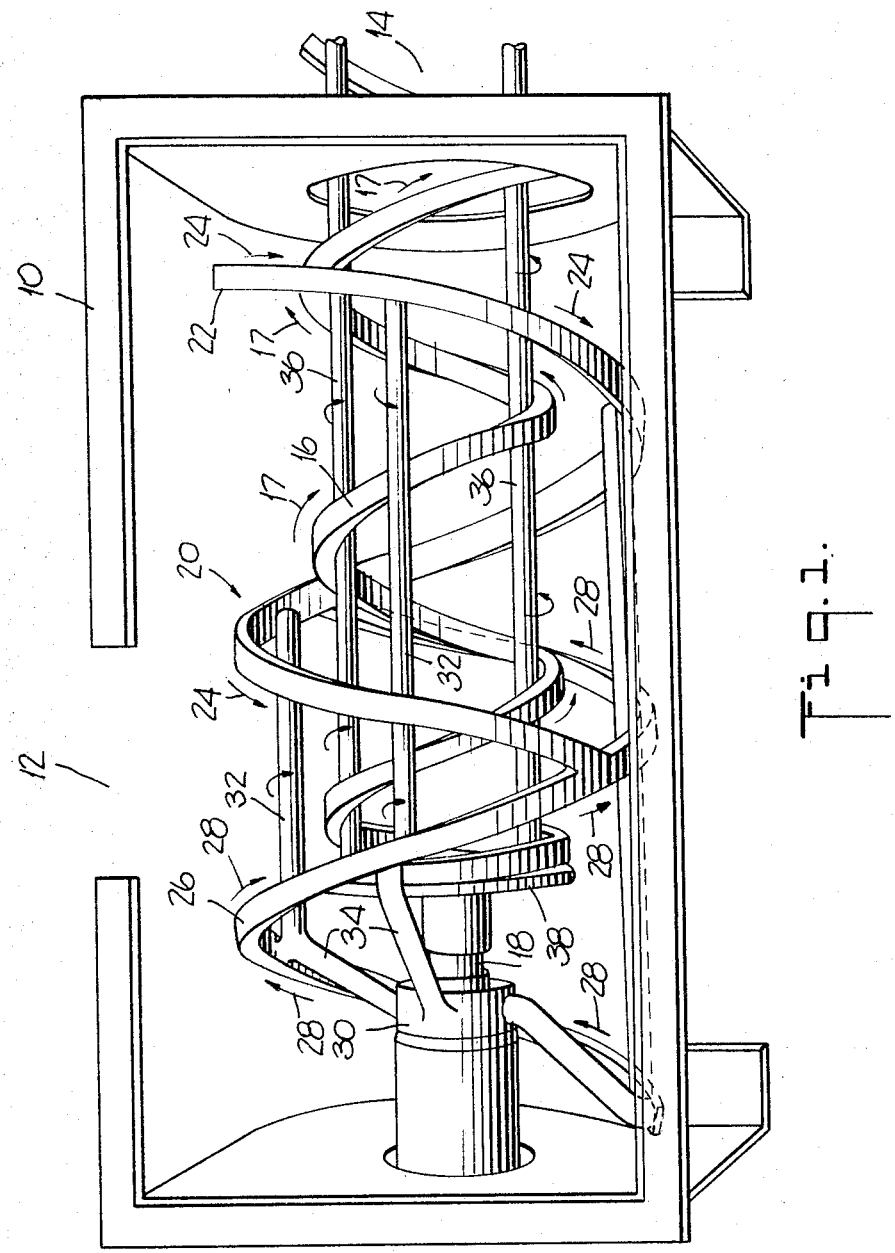
FIG. 1 is a side elevation, partially broken away, showing a conditioning chamber, a pair of augers, and longitudinally extending bars, all constructed in accordance with the principles of my invention.

In the embodiment of the invention illustrated in FIG. 2, the apparatus for conditioning and dispensing particulate solid material comprises a conditioning chamber 10 having an upper material inlet 12 and an outlet 14. A cover 15 is provided for the inlet, and a suitable cover, not shown, is provided for closing the outlet, thereby forming a closeable conditioning chamber.

Still referring to FIG. 2, a first or metering auger 16 is disposed within the chamber 10 and extends toward the outlet 14. This auger has a helical blade for propelling the material towards the outlet as indicated by arrows 17 in response to rotation of the auger, the rotational force being provided by drive shaft 18 provided for the purpose. An intromitter or second open, spiral, larger auger indicated generally at 20 is mounted co-axially with respect to said first auger 16 for conditioning and feeding the material into the first auger in response to rotation of the second auger. As seen in FIG. 2, the second auger 20 is disposed concentrically and in overlapping relationship with respect to the first auger. A portion 22 of the second auger 20 has a pitch which is reversed with respect to the pitch of the first auger for creating a counter-current movement, as indicated by the arrows 24, of the material in the chamber to the direction imparted to it by the first auger. The remaining portion 26 of the auger 20 has a pitch which is in the same direction as the pitch of the first auger 16 and moves the material as indicated by the arrows 28.

The rotational force for driving the second or metering auger 20, FIG. 2, is provided by a drive shaft 30 which is concentrically disposed with respect to the drive shaft 18 for the first auger 16. The two augers are driven at a preselected ratio of speeds by said drive shafts. This structure prevents the materials from compacting at either end of the conditioning chamber while still insuring a constant and reliable flow of material into the metering or first auger.

In the embodiment of the invention illustrated in

FIG. 1, the apparatus for conditioning and dispensing particulated solid material comprises elements just described in connection with FIG. 2 including a first auger 16 and a second auger 20 which are mounted in the chamber 10, as shown. Also, the second auger 20 has a portion 22 which has a pitch which is reversed with respect to the pitch of the first auger 16. Further, in the embodiment of FIG. 1, a plurality of longitudinally extending bars 32 are mounted inwardly of the second auger 20 and outwardly of the first auger 16, as by means of supports 34. These bars are rotated with the second auger 20 by means of drive shaft 30. Still referring to FIG. 1, a second plurality of longitudinally extending bars 36 are mounted inwardly of the first auger 16. These bars are mounted on hub 38 and are rotated with the first auger 16 by means of drive shaft 18. Both sets of bars 32 and 36 serve to enhance the mixing action of the material in the chamber. Thus, two or more dried chemicals can be successfully mixed regardless of differing particle sizes.

Referring next to FIG. 3, there is shown another embodiment of my invention wherein like numerals refer to like parts, as described hereinbefore. In this embodiment, the first or metering auger 16 has a helical blade for propelling the material toward the outlet, as indicated by arrows 17 in response to rotation of the auger. However, a second or intromitter auger 40 is mounted coaxially with respect to said first auger 16 for conditioning and feeding the material into the first auger in response to rotation of the second auger. The second auger 40 is disposed concentrically and in overlapping relationship with respect to the first auger, and the pitch of the entire second auger is reversed wtih respect to the pitch of the first auger for creating a counter-current movement, as indicated by the arrows 42, of the material in the chamber to a direction imparted to it by the first auger. The rotational force for driving the second or metering auger 40 is provided by the drive shaft 30, as shown in FIG. 3. Thus, it is seen that the material is thoroughly mixed and conditioned in the chamber 10.

In FIG. 4 there is illustrated another embodiment of my invention wherein like numerals refer to like parts, as described hereinbefore. A first auger 44 is disposed within the chamber 10 and has a helical blade for propelling the material in the direction as indicated by arrows 46, FIG. 4, in response to rotation of the auger as by means of shaft 18. A second open spiral, larger auger 48 is mounted coaxially with respect to the first auger for conditioning and thence feeding said material into the first auger 44 in response to rotation of the second auger as by means of shaft 30. The second auger 48 is disposed concentrically and in overlapping relationship with respect to said first auger and has a reversed pitch with respect to the pitch of the first auger for creating a counter-current movement of the material in the chamber as indicated by the arrows 50. It will be appreciated that the two augers are driven at a preselected ratio of speeds by said drive shafts. Again, it will be seen that the material is thoroughly mixed and conditioned in the chamber 10.

From the foregoing description, it will be appreciated that the present invention contributes a new and improved apparatus for mixing and conditioning particulate solid material.

Although particular embodiments of the invention are herein disclosed for purposes of explanation, modifications thereof after study of this specification, will be apparent to those skilled in the art to which the invention pertains. Reference should accordingly be had to the appended claims in determining the scope of the invention.

What is claimed and desired to be secured by Letters Patent is:

1. Apparatus for conditioning and dispensing particulated solid material comprising a closeable conditioning chamber having an upper receiving inlet and a dispensing outlet, a first auger disposed within said chamber and extending toward said outlet and having a helical blade for propelling said material toward said outlet in response to rotation of the auger, a second larger open spiral auger mounted coaxially with respect to said first auger for feeding said material into said first auger in response to rotation of the second auger, said second auger being disposed concentrically and in overlapping relationship with respect to said first auger, said second auger having a portion thereof with reversed pitch with respect to the pitch of said first auger for creating a counter-current movement of the material in the chamber to the direction imparted to it by the first auger, means for rotating said augers at a preselected ratio of speeds, and a plurality of longitudinally extending bars mounted inwardly of said second auger and outwardly of said first auger.

2. Apparatus for conditioning and dispensing particulated solid material comprising a closeable conditioning chamber having an upper receiving inlet and a dispensing outlet, a first auger disposed within said chamber and extending toward said outlet and having a helical blade for propelling said material toward said outlet in response to rotation of the auger, a second larger open spiral auger mounted coaxially with respect to said first auger for feeding said material into said first auger in response to rotation of the second auger, said second auger being disposed concentrically and in overlapping relationship with respect to said first auger, said second auger having a portion thereof with reversed pitch with respect to the pitch of said first auger for creating a counter-current movement of the material in the chamber to the direction imparted to it by the first auger, means for roating said augers at a preselected ratio of speeds, and a plurality of longitudinally extending bars mounted inwardly of said second auger and outwardly of said first auger, said longitudinally extending bars rotate with said second auger.

3. Apparatus for conditioning and dispensing particulated solid material comprising a closeable conditioning chamber having an upper receiving inlet and a dispensing outlet, a first auger disposed within said chamber and extending toward said outlet and having a helical blade for propelling said material toward said outlet in response to rotation of the auger, a second larger open spiral auger mounted coaxially with respect to said first auger for feeding said material into said first auger in response to rotation of the second auger, said second auger being disposed concentrically and in overlapping relationship with respect to said first auger, said second auger having a portion thereof with reversed pitch with respect to the pitch of said first auger for creating a counter-current movement of the material in the chamber to the direction imparted to it by the first auger, means for rotating said augers at a preselected ratio of speeds, and a plurality of longitudinally extending bars mounted inwardly of said first auger.

4. Apparatus for conditioning and dispensing particulated solid material comprising a closeable conditioning chamber having an upper receiving inlet and a dispensing outlet, a first auger disposed within said chamber and extending toward said outlet and having a helical blade for propelling said material toward said outlet in response to rotation of the auger, a second larger open spiral auger mounted coaxially with respect to said first auger for feeding said material into said first auger in response to rotation of the second auger, said second auger being disposed concentrically and in overlapping relationship with respect to said first auger, said second auger having a portion thereof with reversed pitch with respect to the pitch of said first auger for creating a counter-current movement of the material in the chamber to the direction imparted to it by the first auger, means for rotating said augers at a preselected ratio of speeds, a plurality of longitudinally extending bars mounted inwardly of said first auger, said longitudinally extending bars rotate with said first auger.

5. Apparatus for conditioning particulated solid material comprising a horizontally disposed closable conditioning chamber, a first auger disposed within said chamber and having a helical blade for propelling said material in response to rotation of the auger, a second larger open spiral auger mounted coaxially with respect to said first auger for conditioning and thence feeding said material into said first auger in response to rotation of the second auger, said second auger being disposed concentrically and in overlapping relationship with respect to said first auger, said first auger having a portion only thereof with reversed pitch with respect to the pitch of said second auger for creating a counter-current movement of the material in the chamber to a direction imparted to it by the second auger, and means for rotating said augers at a preselected ratio of speeds.

6. Apparatus for conditioning particulated solid material comprising a horizontally disposed closeable conditioning chamber, a first auger disposed within said chamber and having a helical blade for propelling said material in response to rotation of the auger, a second larger open spiral auger mounted co-axially with respect to said first auger for conditioning and thence feeding said material into said first auger in response to rotation of the second auger, said second auger being disposed concentrically and in overlapping relationship with respect to said first auger, said second auger having at least a portion thereof with reversed pitch with respect to the pitch of said first auger for creating a counter-current movement of the material in the chamber to the direction imparted to it by the first auger, a plurality of longitudinally extending bars mounted inwardly of said second auger and outwardly of said first auger, said longitudinally extending bars being rotated with said second auger, a second plurality of longitudinally extending bars mounted inwardly of said first auger and being rotated with said first auger, and means for rotating said augers at a preselected ratio of speeds.

References Cited

UNITED STATES PATENTS

| | | |
|---|---|---|
| 1,128,043 | 2/1915 | Quigley. |
| 1,796,659 | 3/1931 | Moyer _____ 259—179 |
| 2,298,317 | 10/1942 | Smith _____ 259—105 X |
| 2,509,543 | 5/1950 | Truax _____ 198—213 X |
| 2,641,369 | 6/1953 | Mulcey et al. _____ 198—213 X |
| 3,186,602 | 6/1965 | Ricciardi _____ 222—161 |

ROBERT B. REEVES, *Primary Examiner.*

N. L. STACK, Jr., *Assistant Examiner.*

U.S. Cl. X.R.

222—413